(12) United States Patent
Johnson, Sr. et al.

(10) Patent No.: US 8,443,429 B1
(45) Date of Patent: May 14, 2013

(54) INTEGRATED SIGN ON

(75) Inventors: Robert S. Johnson, Sr., Louisburg, KS (US); Elton Tila, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 458 days.

(21) Appl. No.: 12/786,277

(22) Filed: May 24, 2010

(51) Int. Cl.
*H04L 29/06* (2006.01)

(52) U.S. Cl.
USPC ............... 726/8; 726/1; 726/2; 726/3; 726/4; 726/5; 726/6; 726/7; 726/9

(58) Field of Classification Search .................... 726/1–9
See application file for complete search history.

(56) References Cited

U.S. PATENT DOCUMENTS

| | | | |
|---|---|---|---|
| 5,293,488 A | 3/1994 | Riley et al. | |
| 5,659,547 A | 8/1997 | Scarr et al. | |
| 5,742,668 A | 4/1998 | Pepe et al. | |
| 5,742,905 A | 4/1998 | Pepe et al. | |
| 5,991,882 A | 11/1999 | O'Connell | |
| 6,009,177 A | 12/1999 | Sudia | |
| 6,205,478 B1 | 3/2001 | Sugano et al. | |
| 6,240,512 B1 | 5/2001 | Fang et al. | |
| 6,321,334 B1 | 11/2001 | Jerger et al. | |
| 6,471,486 B1 | 10/2002 | Centers et al. | |
| 6,519,647 B1 | 2/2003 | Howard et al. | |
| 6,609,115 B1 | 8/2003 | Mehring et al. | |
| 6,816,871 B2 * | 11/2004 | Lee ....................................... | 1/1 |
| 6,836,799 B1 | 12/2004 | Philyaw et al. | |
| 6,898,577 B1 | 5/2005 | Johnson | |
| 7,016,875 B1 | 3/2006 | Steele et al. | |
| 7,089,585 B1 | 8/2006 | Dharmarajan | |
| 7,155,614 B2 | 12/2006 | Ellmore | |
| 7,194,764 B2 | 3/2007 | Martherus et al. | |
| 7,251,732 B2 | 7/2007 | Jamieson et al. | |
| 7,260,581 B1 | 8/2007 | Cimini et al. | |
| 7,260,838 B2 | 8/2007 | Bones et al. | |
| 7,334,254 B1 | 2/2008 | Boydstun et al. | |
| 7,346,930 B1 | 3/2008 | Boydstun et al. | |
| 7,350,229 B1 * | 3/2008 | Lander .............................. | 726/8 |
| 7,428,750 B1 | 9/2008 | Dunn et al. | |
| 7,496,756 B2 | 2/2009 | Oka et al. | |
| 7,496,954 B1 * | 2/2009 | Himawan et al. .................. | 726/8 |
| 7,503,065 B1 | 3/2009 | Packingham et al. | |
| 7,636,852 B1 | 12/2009 | Balasubramanian et al. | |

(Continued)

OTHER PUBLICATIONS

Office Action dated May 3, 2011, U.S. Appl. No. 12/502,227, filed Jul. 13, 2009.

(Continued)

*Primary Examiner* — Catherine Thiaw (57) ABSTRACT

A method of integrated signon is provided comprising receiving a login request to begin a desktop session, the login request comprising a first user identification and a first user password. The method comprises authenticating the first user identification and the first user password using data stored in a first authentication domain. The method comprises starting the desktop session and receiving a request from the desktop session to access an application associated with a second authentication domain. The method comprises retrieving authorization data associated with the second authentication domain from the first authentication domain based on the first user identification and the user password. The method comprises sending the request to access the application associated with the second authentication domain with the authorization data to the application associated with the second authentication domain. The method comprises the application associated with the second authentication domain authorizing the requested access.

10 Claims, 6 Drawing Sheets

U.S. PATENT DOCUMENTS

| | | | |
|---|---|---|---|
| 7,639,794 | B2 | 12/2009 | Iwatsu et al. |
| 8,006,298 | B1 | 8/2011 | Balasubramanian et al. |
| 8,195,819 | B1 | 6/2012 | Delker et al. |
| 2002/0091639 | A1 | 7/2002 | Mandahl et al. |
| 2003/0120593 | A1 | 6/2003 | Bansal et al. |
| 2003/0154403 | A1 | 8/2003 | Keinsley et al. |
| 2004/0034594 | A1 | 2/2004 | Thomas et al. |
| 2004/0117386 | A1 | 6/2004 | Lavender et al. |
| 2004/0148565 | A1 | 7/2004 | Davis et al. |
| 2004/0255154 | A1 | 12/2004 | Kwan et al. |
| 2004/0260942 | A1* | 12/2004 | Jamieson et al. ............. 713/201 |
| 2004/0260953 | A1* | 12/2004 | Jamieson et al. ............. 713/202 |
| 2005/0198501 | A1 | 9/2005 | Andreev et al. |
| 2006/0048211 | A1* | 3/2006 | Pierson et al. .................... 726/3 |
| 2006/0075224 | A1 | 4/2006 | Tao |
| 2007/0209065 | A1* | 9/2007 | Branam et al. .................... 726/5 |
| 2007/0250905 | A1 | 10/2007 | Clark et al. |
| 2008/0069102 | A1 | 3/2008 | Koehler et al. |
| 2008/0134307 | A1* | 6/2008 | Ashkenazi et al. ............... 726/6 |
| 2008/0184349 | A1 | 7/2008 | Ting |
| 2008/0285559 | A1 | 11/2008 | Luo et al. |
| 2010/0043065 | A1* | 2/2010 | Bray et al. ........................ 726/8 |
| 2010/0050251 | A1* | 2/2010 | Speyer et al. ................... 726/20 |
| 2011/0138452 | A1* | 6/2011 | Dooley et al. ..................... 726/8 |
| 2011/0239269 | A1* | 9/2011 | Wahl et al. ........................ 726/1 |

OTHER PUBLICATIONS

Notice of Allowance dated Jan. 20, 2012, U.S. Appl. No. 12/502,227, filed Jul. 13, 2009.

Examiner's Answer dated Aug. 23, 2011, U.S. Appl. No. 11/403,619, filed Apr. 13, 2006.

Final Office Action dated Oct. 11, 2011, U.S. Appl. No. 12/502,227, filed Jul. 13, 2009.

Second Examiner's Answer dated Nov. 21, 2011, U.S. Appl. No. 11/403,619, filed Apr. 13, 2006.

Advisory Action dated Dec. 13, 2011, U.S. Appl. No. 12/502,227, filed Jul. 13, 2009.

Citrix Systems, Citrix MetaFrame Password Manager, Apr. 22, 2004.

Microsoft, Digital Dashboard Business Process Assessment Guide White Paper, May 2000.

Pashalidis, Andreas et al., A Taxonomy of Single Sign-on Systems, Information Security and Privacy, 2003.

Boydstun, Ken, Patent Application entitled, "Security Framework Bridge", filed Oct. 31, 2003, U.S. Appl. No. 10/284,680.

Boydstun, Kenneth C. et al, Patent Application entitled, "Business-to-Business Security Integration", filed Jul. 31, 2003, U.S. Appl. No. 10/631,984.

Allababidi, Mouaz, et al., "Integrated User Profile Administration Tool", filed Apr. 13, 2006, U.S. Appl. No. 11/403,619 .

Balasubramanian, Balagurunathan, et al., "Fraud Detection System and Method", filed Jul. 11, 2006, U.S. Appl. No. 11/484,420.

Delker, Jason R., et al., Patent Application entitled, "Application Single Sign on Leveraging Virtual Local Area Network Identifier," filed Jul. 13, 2009, U.S. Appl. No. 12/502,227.

Office Action dated Apr. 25, 2008; U.S. Appl. No. 10/960,535, filed Oct. 7, 2004.

Final Office Action dated Oct. 10, 2008; U.S. Appl. No. 10/960,535, filed Oct. 7, 2004.

Office Action dated Jan. 9, 2009; U.S. Appl. No. 10/960,535, filed Oct. 7, 2004.

Office Action dated Apr. 29, 2009; U.S. Appl. No. 10/960,535, filed Oct. 7, 2004.

Notice of Allowance dated Sep. 25, 2009; U.S. Appl. No. 10/960,535, filed Oct. 7, 2004.

Office Action dated Apr. 14, 2008; U.S. Appl. No. 10/994,997, filed Nov. 22, 2004.

Notice of Allowance and Fee(s) Due dated Oct. 23, 2008, U.S. Appl. No. 10/994,997, filed Nov. 22, 2004.

Office Action dated Mar. 17, 2008, U.S. Appl. No. 11/403,619, filed Apr. 13, 2006.

Final Office Action dated Oct. 6, 2008, U.S. Appl. No. 11/403,619, filed Apr. 13, 2006.

Office Action dated Dec. 31, 2008, U.S. Appl. No. 11/403,619, filed Apr. 13, 2006.

Office Action dated Jun. 9, 2009, U.S. Appl. No. 11/403,619, filed Apr. 13, 2006.

Final Office Action dated Jan. 6, 2010, U.S. Appl. No. 11/403,619, filed Apr. 13, 2006.

Advisory Action dated Mar. 23, 2010, U.S. Appl. No. 11/403,619, filed Apr. 13, 2006.

Office Action dated Jul. 22, 2010, U.S. Appl. No. 11/403,619, filed Apr. 13, 2006.

Final Office Action dated Jan. 6, 2011; U.S. Appl. No. 11/403,619, filed Apr. 13, 2006.

Advisory Action dated Mar. 15, 2011, U.S. Appl. No. 11/403,619, filed Apr. 13, 2006.

Office Action dated Apr. 6, 2010, U.S. Appl. No. 11/484,420, filed Jul. 11, 2006 13 pages.

Office Action dated Oct. 28, 2010, U.S. Appl. No. 11/484,420, filed Jul. 11, 2006.

Notice of Allowance dated Apr. 14, 2011, U.S. Appl. No. 11/484,420, filed Jul. 11, 2006.

Office Action-Restriction dated Feb. 24, 2011, U.S. Appl. No. 12/502,227, filed Jul. 13, 2009.

\* cited by examiner

INTEGRATED SIGN ON

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When two or more organizations combine operations in a business merger, acquisition, or other transaction, each organization may have a unique and specialized information technology infrastructure. Their infrastructures may comprise directory services, messaging systems, security policies, data structures, and hardware configurations that are specific to the organizations' businesses and organizational structures. Their infrastructures may have taken years to develop and refine and may have cost many millions of dollars to build. Merging the information infrastructures of at least two organizations may be costly, time consuming, and subject to political forces within each organization. The differing organizational and business structures of merging entities, internal political pressures, and the significant costs involved may result in lengthy delays and complications in merging the information infrastructures of the constituent organizations. Mergers or other combinations of organizations that involve complex integrations of information technology infrastructures are not restricted to private for-profit business enterprises. Hospitals, governmental bodies, non-profit organizations, universities, and school districts are examples of other types of entities that merge or combine wherein resolution of information technology issues may take an extended period.

SUMMARY

In an embodiment, a method of integrated signon is provided. The method comprises receiving a login request to begin a desktop session, the login request comprising a first user identification and a first user password. The method also comprises authenticating the first user identification and the first user password using data stored in a first authentication domain. The method also comprises starting the desktop session and receiving a request from the desktop session to access an application associated with a second authentication domain. The method also comprises retrieving authorization data associated with the second authentication domain from the first authentication domain based on the first user identification and the user password. The method also comprises sending the request to access the application associated with the second authentication domain with the authorization data to the application associated with the second authentication domain. The method also comprises the application associated with the second authentication domain authorizing the requested access.

In an embodiment, a method of authenticating a hypertext transport protocol (HTTP) request for a web application is provided. The method comprises receiving a login request to begin a desktop session, the login request comprising a first user identification and a first user password. The method also comprises authenticating the first user identification and the first user password using data stored in a first authentication domain. The method also comprises starting the desktop session and receiving a hypertext transport protocol request from a web browser running in the desktop session to access a web application associated with a second authentication domain. The method also comprises retrieving authorization data associated with the second authentication domain from the first authentication domain based on the first user identification and the user password. The method also comprises inserting a hypertext transport protocol header variable containing at least some of the authorization data associated with the second authentication domain into the hypertext transport protocol request. The method also comprises sending the hypertext transport protocol request to access the web application associated with the second authentication domain. The method also comprises the web application associated with the second authentication domain authorizing the requested access.

In an embodiment, a method is provided. The method comprises an identity management server identifying a first application associated with a first authentication domain. The method also comprises the identity management server identifying a second application associated with the second authentication domain. The method also comprises the identity management server building a table defining authorized access to applications across the first and the second authentication domains wherein access to the first application is authorized for the second user device authenticating in the second authentication domain and wherein access to the second application is authorized for the first user device authenticating in the first authentication domain. The method also comprises the identity management server creating a first authorization data associated with the first application and associating the first authorization data with the user device entry for the second user device authenticating in the second authentication domain. The method also comprises the identity management server creating a second authorization data associated with the second application and associating the second authorization data with the user device entry for the first user device authenticating in the first authentication domain. The method also comprises the first user device authenticating in the first authentication domain and the first user device executing an instruction to start the second application. The method also comprises the identity management application determining from at least one entry in the table that the first user device is authorized to access the second application. The method also comprises the identity management application accessing the second authorization data associated with the second application and associated with the first user device and sending the second authorization data to the second application. The method also comprises the second application receiving the second authorization data and granting access to the first user device. These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure describes a system and methods of integrated signon promoting single signon to a plurality of independent domains effectively integrating the domains without placing an authorization burden on applications. The system promotes a database associated with a first authentication domain to store authorization data permitting access to software applications associated with a second authentication domain. System components enable a single integrated signon to provide access to applications associated with both domains without merging the domains. A user authenticating in the first domain with credentials linked to the stored authorization data for applications accessible via the second domain will automatically receive access to those applications without the need to authenticate with the second domain or authenticate with the individual applications. Although the user authenticates with a domain different from the domain with which the accessed application is associated, the user takes no additional actions to access the application. The selected application in the second domain provides access without the need for the user to provide credentials beyond those already provided to authenticate in the first domain. Authorization data providing access to applications in the second domain is associated with authorized users that authenticate in the first domain. When the user starts one of the applications, the authorization data is passed from the first domain to the application in the second domain, and the user receives access.

When organizations merge, users in each merging organization often need access to software applications brought to the merger by the other organizations. The users may need access sooner than the merging organizations are able to merge their directory and application infrastructures. In some cases, certain applications of one of the participants in the merger are chosen as the applications that will be used by both merging organizations going forward. Examples of such applications may be employee data management applications and document management applications. A single organization created by a merger of two companies, for example, would not normally continue on a permanent basis to use each of the employee data management applications previously used by each of the companies. One of the two would be chosen as the application to be permanently used going forward. Users in the merging companies may need access to the critical applications fairly soon after the merger finalizes. Human resources professionals, for example, of the merging organizations may need to begin working closely together even before the merger is fully consummated. The professionals may not be able to wait for the two organizations to fully merge directory structures and authentication processes critical to human resources operations.

The present disclosure allows a user in a first organization to be provided access to applications available in a second organization based on authentication of the user in the domain associated with the first organization. The user in the first organization is relieved of the task of authenticating in the domain of the second organization or authenticating with individual applications associated with the second domain. Minimal or no additional processing burden is placed on the applications in the second domain. The applications associated with the second domain receive authorization data for users from the first domain. The authorization data is stored in a database associated with the first domain and provides authorization for users in the first domain to access applications associated with the second domain. When a user that has been authenticated in the first domain selects an application associated with the second domain, the authorization data is sent from the database to the selected application. The selected application receives the authorization data and may then authorize the user from the first domain in a manner no different than it may authorize users that authenticate in the second domain.

Figure 1:
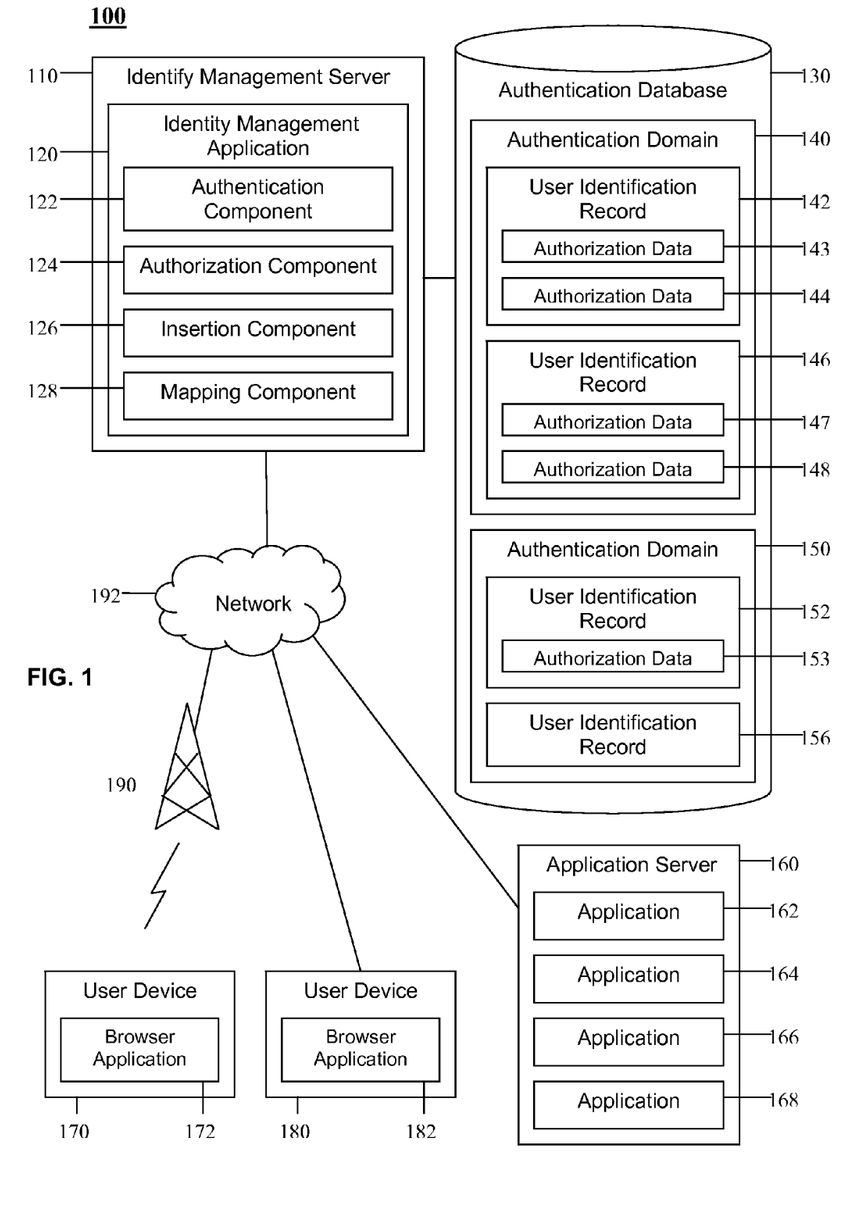
FIG. 1 is a block diagram of a system according to an embodiment of the disclosure.

Turning now to FIG. 1, a system 100 of integrated signon is described. The system 100 comprises an identity management server 110, an identity management application 120, an authentication database 130, authentication domains 140, 150, user identification records 142, 146, 152, 156, an application server 160, applications 162, 164, 166, 168, user devices 170, 180, a base transceiver system 190, and a network 192.

The authentication domains 140, 150 may be referred to as the first authentication domain 140 and the second authentication domain 150, respectively, or may be referred to as the primary authentication domain 140 and the secondary authentication domain 150, respectively. The terms authentication domain 140, first authentication domain 140, and primary authentication domain 140 refer to the same component and may be used interchangeably herein. The terms authentication domain 150, second authentication domain 150, and secondary authentication domain 150 refer to the same component and may be used interchangeably herein.

Domain as used herein refers to a group of computers sharing a common network resource database with a common security policy. A domain may contain one or more domain controllers that act as the resource and user manager for the entire domain. The remaining computers in the domain may be user computers and other devices or servers that provide resources to users authenticating in the domain. In an organization, users may authenticate in one domain and require access to resources associated with another domain. The present disclosure teaches a system and methods for such users who may, for example, authenticate in the first authentication domain 140 and require access to resources, for example applications 166, 168, associated with the second authentication domain 150 wherein those applications 166, 168 may otherwise require authorization in addition to the authentication initially provided by the user to authenticate in the first authentication domain 140. After the user authenticates in the first authentication domain 140 and invokes the application 166 associated with the second authentication domain 150, authorization data 143 is sent to the application 166 that the application 166 reads and uses to grant access to the user coming from the first authentication domain 140. Conversely, system and methods taught herein may promote users who may authenticate in the second authentication domain 150 and need access to resources, for example applications 162, 164, associated with the first authentication domain 140 wherein those resources may otherwise require authorization in addition to the authentication provided by the user to initially authenticate in the second authentication domain 150. After the user authenticates in the second authentication domain 150 and invokes the application 166 associated with the first authentication domain 140, authorization data 153 is sent to the application 162 that the application 162 reads and uses to grant access to the user coming from the second authentication domain 150. The present disclosure teaches the crossing of domain boundaries to access resources in another domain wherein the other domain may use a different directory structure and authentication method. The user crossing domain boundaries is alleviated of the task of securing authorization to access the application in the other domain and the application remains unaware that the user authenticated in a different domain.

The application server 160 hosts applications 162, 164, 166, 168. In an embodiment and in examples used herein, applications 162, 164 are associated with the first authentication domain 140 and applications 166, 168 are associated with the second authentication domain 150. While the applications 162, 164, 166, 168 are depicted in FIG. 1 as executing on one application server 160, the applications 162, 164, 166, 168 may in embodiments execute on a plurality of application servers 160 situated at a plurality of locations.

The identity management server 110 may be implemented by a computer system. Computer systems are described in detail hereinafter. The identity management application 120 executes on the identity management server 110 and promotes a user authenticating in the primary authentication domain 140 to be provided access to applications 162, 164 associated with the primary authentication domain 140 as well as access to applications 166, 168 associated with the secondary authentication domain 150. The access across domains to the applications 166, 168 associated with the secondary authentication domain 150 is provided without requiring additional authentication actions by the user or special authorization steps by the applications 166, 168. The identity management application 120 may access a file or table that maps authentication information entered by the user to access the primary authentication domain 140 to authorization data 143 associated with access to the secondary authentication domain 150. The user that authenticates in the primary authentication domain 140 is provided access to one or more applications 166, 168 associated with the secondary authentication domain 150. The authorization data 143 permitting the cross domain access is passed from the authentication database 130 to the applications 166, 168. The authorization data 143 links the user authenticating in the primary authentication domain 140 with the applications 166, 168 associated with the secondary authentication domain 150. The present disclosure effectively integrates at least two authentication domains 140, 150 for purposes of providing cross-domain access to applications 162, 164, 166, 168 without requiring further action by authorized users and without placing additional authorization burden on the applications 162, 164, 166, 168.

The mapping or linkage of the authorization data 143 to access applications 166, 168 associated with the secondary authentication domain 150 to the credentials used to authenticate in the primary authentication domain 140 alleviates the user from having to authenticate a second time to access the applications 166, 168. The authorization data 143 used to access the desired applications 166, 168 in the secondary authentication domain 150 may be stored in an area of the authentication database 130 associated with the primary authentication domain 140 and be associated with the directory services account of the user in the primary authentication domain 140. When a user that has been authenticated in the primary authentication domain 140 attempts to execute at least one of the applications 166, 168 associated with the secondary authentication domain 150, components of the identity management application 120 may examine the user identification record 142 for that user. The components determine if the user is authorized to access the at least one application 166, 168 the user has attempted to execute. This authorization may have been prearranged for the user and other users in a department, for example. If this authorization is in place or can be determined, the authorization data 143 is associated with the user identification record 142. The identity management application 120 may then pass the authorization data 143 to the at least one desired application 166, 168 associated with the secondary authentication domain 150.

The authorization data 143 may be inserted by the identity management application 120 into a request to the application 166 sent by the user device 170. The selected application 166 will receive the authorization data 143 and provide access to the user. These actions providing the user access across authorization authentication domains 140, 150 may not be apparent to the user. The selected application 166 may require no modification to accept the authorization data 143 and provide access to the user device 170. The application 166 may not be "aware" that the user authenticated in an authentication domain 140 different from the authentication domain 150 with which the application 166 is associated. The application 166 may not regard users that authenticate in the primary authentication domain 140 in a manner different than the application 166 regards users that authenticate in the secondary authentication domain 150.

In an example illustrating the interactions of the components of the system 100, a large company may acquire a small company in a merger transaction. Each company may have its own legacy employee data management application. While the merger is being consummated, it may be decided that the employee data management application of the larger company will be used going forward by the resulting merged organization and that the employee data management application of the smaller company will be phased out and taken offline. Fully consolidating the information infrastructures of the two companies, including authentication processes, may be an extended and costly process. The two companies may use different directory structures and user authentication methodologies. Some employees in the smaller company, for example human resources employees, may need access to the employee data management application in the larger company upon the announcement of the merger.

In this example, the employees of the smaller company log into and authenticate in the primary authentication domain 140. The employee data management application may be the application 166 that is associated with the secondary authentication domain 150 that is part of the larger company. As an alternative to waiting for the primary authentication domain 140 associated with the smaller company to be merged with the secondary authentication domain 150 associated with the larger company and for the applications 162, 164, 166, 168 to be reconfigured accordingly, the system 100 promotes the employees of the smaller company to authenticate in their primary authentication domain 140, execute the applications 166, 168 associated with the secondary authentication domain 150, and receive access without entering additional credentials. An employee of the smaller company may have a user identification record 142 stored in the primary authentication domain 140. Because the employee needs access to the application 166 that is associated with the secondary authentication domain 150, the system 100 provides for the creation of authorization data 143 that enables the employee to access the application 166 across domains. The authorization data 143 promotes automatic cross-domain access of the application 166 associated with the secondary authentication domain 150 to the employee with the user identification record 142 associated with the primary authentication domain 140.

The authorization data 143 is stored in the primary authentication domain 140 and may link, match, or otherwise be specific to the user identification record 142 and the application 166. The authorization data 143 provides a cross reference between the two authentication domains 140, 150. The authorization data 143 may include credentials or other information that the application 166 accepts to allow access to the user from the different authentication domain 140. In FIG. 1, while the authorization data 143 is depicted as inside the user identification record 142, the authorization data 143 is instead associated with the user identification record 142, as is the authorization data 144 that may, for example, provide the user access to the application 168, also associated with the secondary authentication domain 150.

Continuing with the example and providing a converse to the described scenario, it is plausible that when the larger company and the smaller company merge, the applications 162, 164 associated with the smaller company and therefore the primary authentication domain 140 may be chosen to survive the merger. The application 162 may, for example, be a document management application. Employees of the larger company that authenticate in the secondary authentication domain 150 may seek access to the application 162 that is associated with the primary authentication domain 140. An employee of the larger company may be associated with the user identification record 152 in the secondary authentication domain 150. Similar to the previous discussion, authorization data 153 permitting cross-domain access to the application 162 associated with the primary authentication domain 140 may be stored in the secondary authentication domain 150 and may be associated with the user identification record 152 as depicted in FIG. 1. Once the employee of the larger company authenticates in his or her home domain, the secondary authentication domain 150, the employee may then access the application 162. The identity management application 120 detects this attempt to access the application 162 across authentication domains 140, 150 and may send the authorization data 153 to the application 162. Upon receiving the authorization data 153, the application 162 provides access to the employee with the user identification record 152.

The applications 166, 168 associated with the secondary authentication domain 150 provide cross-domain access to the users with the user identification records 142, 144 associated with the primary authentication domain 140. Conversely, the applications 162, 164 associated with the primary authentication domain 140 provide cross-domain access to the users with user identification records 152, 156 associated with the secondary authentication domain 150. This cross-domain access in each direction is provided without the applications 162, 164, 166, 168 performing additional authorization steps. The applications 162, 164, 166, 168 are unaware of their providing access to users that authenticate in domains other than the domain with which each individual application 162, 164, 166, 168 is associated. This alleviation of authorization burden for the applications 162, 164, 166, 168 may limit additional processing load on the applications 162, 164, 166, 168 that may, during the initial stages of an organization merger, be already receiving unusually high usage and perhaps abnormal processing burden because of additional users, some of whom may be new to the application 166. The authorization data 143, 144, 147, 148 providing cross-domain access to applications 166, 168 is associated with the user identification records 142, 146 and stands ready to be sent to the applications 166, 168 when the applications 166, 168 are selected. The authorization data 143, 144, 147, 148 makes the cross-domain access possible without the applications 166, 168 being made aware that the access is by a user from a different domain.

The authentication database 130 is depicted in FIG. 1 as containing both the primary authentication domain 140 and the secondary authentication domain 150. In an embodiment involving a scenario similar to the example described above involving the merger of two separate organizations, the primary authentication domain 140 and the secondary authentication domain 150 may be stored in separate databases. The applications 162, 164, 166, 168 are depicted in FIG. 1 as stored and executing on a single component, the application server 160. In an embodiment, when two separate organizations merge, the applications 162, 164 previously described as associated with the primary authentication domain 140 and the applications 166, 168 previously described as associated with the secondary authentication domain 150 may execute on different computers.

While the example described above used the merger of a larger company and a smaller company to illustrate the actions of the components of the system 100, in other embodiments two or more hospitals, universities, government bodies, non-profit organizations, or other types of organizations may merge. In an embodiment, two or more dissimilar entities may merge or departments, divisions, or other units within a single organization may combine and use cross-domain single signon as taught herein. The present disclosure also teaches the use of the components of the system 100 to provide cross-domain access or the effective integration of two or more domains without the requirement of two or more units or other entities effecting a merger or other organizational combination.

The use of the term "primary" and "first" in primary authentication domain 140 and first authentication domain 140, respectively, and the use of the terms "secondary" and "second" in secondary authentication domain 150 and second authentication domain 150 are not meant to indicate or suggest levels of priority or importance between the two authentication domains 140, 150. The use of these terms is also not to indicate or suggest the size or dominance of one merger participant versus another merger participant when an embodiment of the present disclosure involves two or more entities effecting a merger or other combination. The terms "primary" and "first" and "secondary" and "second" as used herein are solely for discussion purposes to illuminate the teachings of the present disclosure.

The present disclosure describes the first authentication domain 140 and the second authentication domain 150 as being similar in terms of users and their user devices 170, 180 authenticating and, where authorized, gaining access to applications 162, 164, 166, 168 associated with domains other than the domain with which the users authenticate. As noted in the preceding paragraph, the use of the terms "primary" and "first" and the use of the terms "secondary" and "second" in are not meant to indicate or suggest levels of priority or importance between the two authentication domains 140, 150 or their associated applications 162, 164, 166, 168. The two authentication domains 140, 150 are effectively treated as equals in the embodiments described herein. In an alternative embodiment, one of the two authentication domains 140, 150 may be chosen as a primary domain and users may authenticate in this domain. A user that desires access to resources associated with both domains may first authenticate in the primary domain. The cross-domain enabling data or authorization data that permits access to applications and other resources associated with the non-primary domain may reside in the primary domain. The authorization data may be associated with user accounts in the primary domain that have been authorized to access the resources associated with the non-primary domain. When the authorized user attempts to access the resource associated with the non-primary domain, the authorization data is found in the primary domain and is passed to the resource associated with the non-primary domain. The desired resource associated with the non-primary domain receives the authorization data and provides access to the requesting user. In this alternative embodiment, the relationship may be characterized as one way in contrast to the two way relationship as described in detail in the primary embodiment taught herein.

The identity management application 120 comprises the authentication component 122 that receives credentials from user devices 170, 180 in their own authentication domains 140, 150 and authenticates the user devices 170, 180 in that authentication domain 140, 150. For discussion purposes herein, the user device 170 authenticates in the primary authentication domain 140 and the user device 180 authenticates in the secondary authentication domain 150. The primary authentication domain 140 and the secondary authentication domain 150 may use the same or different directory services methodologies, directory structures, and authentication methods. In an embodiment, either or both the primary authentication domain 140 and the secondary authentication domain 150 may not use a directory services methodology to store information about users and other resources in an organization and may use other methodologies to manage these tasks. In an example, the primary authentication domain 140 may use the Active Directory implementation of directory services created by Microsoft Corporation and the secondary authentication domain 150 may use the Open Directory implementation created by Apple Inc.

When the user of the user device 170 logs in and provides his or her user identification and password, the authentication component 122 processes these credentials and provides access to applications 162, 164 associated with the primary authentication domain 140. The user device 170 may not normally have automatic access to applications 166, 168 associated with the secondary authentication domain 150. Organizations operating the primary authentication domain 140 and/or the secondary authentication domain 150 may use a commercial-off-the-shelf software product such as Site-Minder® sold by CA, Inc. to manage authentication of users. The authentication component 122 comprises elements of the commercial-off-the-shelf software and other software components specific to the system 100. Components of the commercial-off-the-shelf software may also interact with other components of the system 100 besides the authentication component 122. Components of the system 100 may make direct modifications to components of the commercial-off-the-shelf software. Components of the system 100 may additionally and/or alternatively be written to interact with some application programming interfaces (API) made available by the commercial-off-the-shelf software.

The commercial-off-the-shelf software may assist in providing authentication services for users authenticating in the primary authentication domain 140 or the secondary authentication domain 150. Authentication activities for both the primary authentication domain 140 and the secondary authentication domain 150 may be unified and consolidated by the commercial-off-the-shelf software. This may be valuable when the primary authentication domain 140 and the secondary authentication domain 150 use different directory services methodologies and authentication practices. The commercial-off-the-shelf software may provide a bridging between the authentication domains 140, 150 when they store and organize directory objects and authenticate users in different ways as may be the case with merging organizations. The commercial-off-the-shelf software may assist in determining the proper format for user identification and other information that may be contained in authorization data 143. The commercial-off-the-shelf software may also assist in injecting or inserting the authorization data 143 into requests generated by the user device 170 for accessing applications 166, 168 across domains.

The identity management application 120 also comprises the authorization component 124 that provides the means to a user authenticated in the primary authentication domain 140 to access applications 166, 168 associated with the secondary authentication domain 150. This access is provided without the user needing to provide credentials to the applications 166, 168 and without the applications 166, 168 being aware that the user has authenticated in a different authentication domain 140. Authorization data 143 is stored in an area of the authentication database 130 associated with the primary authentication domain 140. Authorization data 143 permits the user authenticated in the primary authentication domain 140 to receive access to the applications 166, 168 associated with the secondary authentication domain 150. Authorization data 143 may have been created for a plurality of users that authenticate in the primary authentication domain 140 that need to be provided access to applications 166, 168 associated with the secondary authentication domain 150. Individual instances of authorization data 143 may be created and stored for each individual user that is provided cross-domain access to at least one application 166, 168 in the other authentication domain 150. An instance of authorization data 143, may, for example list the user identification record 142 associated with the user of the user device 170 and may list the application 166 to which the user is to be provided access.

The database 130 may contain a plurality of instances of authorization data 143, 144, 147, 148 containing combinations of user identification records 142, 144 and applications 166, 168 involving cross-domain access for users authenticating in the first authentication domain 140 accessing applications 166, 168 associated with the second authentication domain 150. The database 130 may likewise and conversely contain a combination of authorization data 153 and instances of user identification records 152 allowing cross-domain access for a user authenticating in the second authentication domain 150 to access applications 162, 164 associated with the first authentication domain 140.

The plurality of instances of authorization data 143, 144 stored in the primary authentication domain 140 in the database 130 permitting cross-domain access to applications 166, 168 may comprise a plurality of attributes associated with the secondary authentication domain 150. When the user of the user device 170 has been authenticated into the primary authentication domain 140 by the authentication component 122 and then invokes the application 166 associated with the secondary authentication domain 150, the authorization component 124 may examine a table or file. The table or file may contain a policy linking the user identification record 142 with the application 166. The policy may have been previously created with many other policies like it linking other user identification records 144 with applications 166, 168. When the authorization component 124 locates a policy permitting the requested cross-domain access, it may access the authorization data 143 associated with the requesting user identification record 142 and the requested application 166 or it may dynamically create the authorization data 143. When the user of the user device 170 attempts to access the application 166 and it is determined that the user is authorized to be provided cross-domain access to the application 166, the authorization data 143 may be drawn from storage in the database 130. The authorization data 143 may alternatively be dynamically created based on information contained in the user identification record 142 and in the database 130 about the application 166. The authorization data 143 may then be encapsulated in the request to access the application 166 in an electronic cookie, token, or similar file that instructs the application 166 to provide access to the user associated with the user identification record 142.

The identity management application 120 also comprises the insertion component 126 that inserts the authorization data 143 into the request made by the user device 170 for access to the application 166. In an embodiment, the applications 162, 164, 166, 168 may be web-based applications that are accessed by user devices 170, 180 using browser applications 172, 182 executing on the user devices 170, 180, respectively. The user may start the browser application 172 on the user device 170 and attempt to access a web based application 166 associated with the secondary authentication domain 150. Once the authorization component 124 has determined that the user is authorized for cross-domain access of the application 166, the authorization component 124 may extract the authorization data 143 from its storage in the database 130 or dynamically create the authorization data 143. The insertion component 126 may then insert a hypertext transport protocol header variable containing at least some of the authorization data 143 into the instance of the browser application 172 started by the user device 170. The present disclosure teaches the creation of a field in the hypertext transport protocol header of the browser application transmission, the field created for the hypertext transport protocol header variable to contain the authorization data 143.

The insertion component 126, that may comprise software components that interact with components of the commercial-off-the-shelf software, may recognize that the hypertext transport protocol request generated by the user device 170 is intended for an application 166 associated with the different authentication domain 150. The insertion component 126 may effectively intercept the hypertext transport protocol transmission and examine the user agent associated with the hypertext transport protocol request. The insertion component 126, working with components of the commercial-off-the-shelf software, inserts the hypertext transport protocol header variable into the specially created field of the hypertext transport protocol header. The insertion component 126 designates the appropriate data from the authorization data 143 as the variable in the field. The insertion of this data and recognition by the application 166 permits the cross-domain access to the application 166.

When the cross-domain request is received by the application 166 in the form of an incoming hypertext transport protocol transmission, the application 166 may examine the hypertext transport protocol header, recognize the field created in the header as containing a special variable or item of data, and extract the data from the field. The data extracted is the authorization data 143 inserted into the field by the insertion component 126. The application 166 reads the authorization data 143 that instructs the application 166 to permit the user access to the application 166. Because the application 166 reads all fields contained in the hypertext transport protocol header variable of the browser transmission, extracting and reading the authorization data 143 from the hypertext transport protocol header places minimal or no additional processing burden on the application 166. The authorization data 143 may be stored in a field of the hypertext transport protocol header with the name SMUSERNAME, PSUSERNAME, or other name. The applications 166, 168 accessed in the cross-domain manner taught by the present disclosure may be web applications and may comprise an employee data management application, a document management application, and other types of applications.

The applications 162, 164, 166, 168 as described in the present disclosure are not limited to web-based applications or other applications 162, 164, 166, 168 that use the hypertext transport protocol or other components of the internet protocol (IP) suite of protocols. In an embodiment, applications 162, 164, 166, 168 may be client/server-based applications 162, 164, 166, 168 that do not use the hypertext transport protocol to transmit communications. In an embodiment, the user device 170, 180 may have client software installed (not shown) that the user devices 170, 180 invoke for access to such client/server-based applications 162, 164, 166, 168.

The identity management application 120 also comprises the mapping component 128 that may create and manage a plurality of associations between user identification records 142, 146 in one authentication domain 140 and applications 166, 168 associated with another authentication domain 150 wherein cross-domain access as taught herein is provided. In an exemplary embodiment of the present disclosure, two organizations may merge and a plurality of users that authenticate with the primary authentication domain 140 may seek access to the applications 166, 168 associated with the secondary authentication domain 150. The users may seek access with minimal delay and the access may preferably be virtually seamless in appearance to the users wherein they are not requested for authentication by the applications 166, 168. The mapping component 128 may provide a listing of the user identification records 142, 146 in the primary authentication domain 140 and the applications 166, 168 associated with the secondary authentication domain 150 to be associated with each other and cross-domain access provided. The mapping component 128 may create a table or file in the authentication database 130 that describe each of the associations permitted. The table or file may contain instantiations of the permitted associations and authorization data 143 or may describe policies wherein associations are permitted. The components of the identity management application 120 may draw upon the policies to construct authorization data 143 when this is done so dynamically.

The mapping component 128 may manage the files or tables containing a plurality of authorized associations of user identification records 142, 146, 152, 156 with applications 162, 164, 166, 168. The mapping component 128 may make adjustments or changes to the files when personnel assignments change and a user with the user identification record 146 that previously was authorized to receive access to the application 168 is no longer authorized to receive such access, for example. In the early stages of a merger of two or more organizations, such changes may be frequent. The mapping component 128 manages the authorized associations of user identification records 142, 146, 152, 156 with applications 162, 164, 166, 168 and makes additions, deletions, and other changes to the authorized associations as directed.

The user devices 170, 180 may be desktop computers, laptop computers, or tablet computers. The user devices 170, 180 may also be portable electronic devices such as mobile telephones, personal digital assistants (PDA), and media players.

The base transceiver station 190 may be any of a cellular wireless base station, for example a Code Division Multiple Access (CDMA), a Global System for Mobile Communications (GSM), a Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 190, in an embodiment a plurality of base transceiver stations 190 may be existent and in operation.

The network 192 promotes communication between the components of the system 100. The network 192 may be any communication network including a public data network (PDN), a public switched telephone network (PSTN), a private network, and/or a combination.

The discussion herein has described resources, for example applications, associated with one domain that are accessed by users and user devices that may authenticate in a different domain. The applications have variously been described as web applications accessed using web browsers wherein the hypertext transport protocol is used and user agents of the hypertext transport protocol transmissions may be modified. These disclosures do not preclude the use of other types of applications and other models of interaction between user devices 172, 182 and the identity management server 110, the authentication database 130, and the application server 160. Such other applications and models of interaction may, for example, use a socket approach to inter-process communication and may not use the hypertext transport protocol for transmissions between the components of the system 100.

Figure 2:
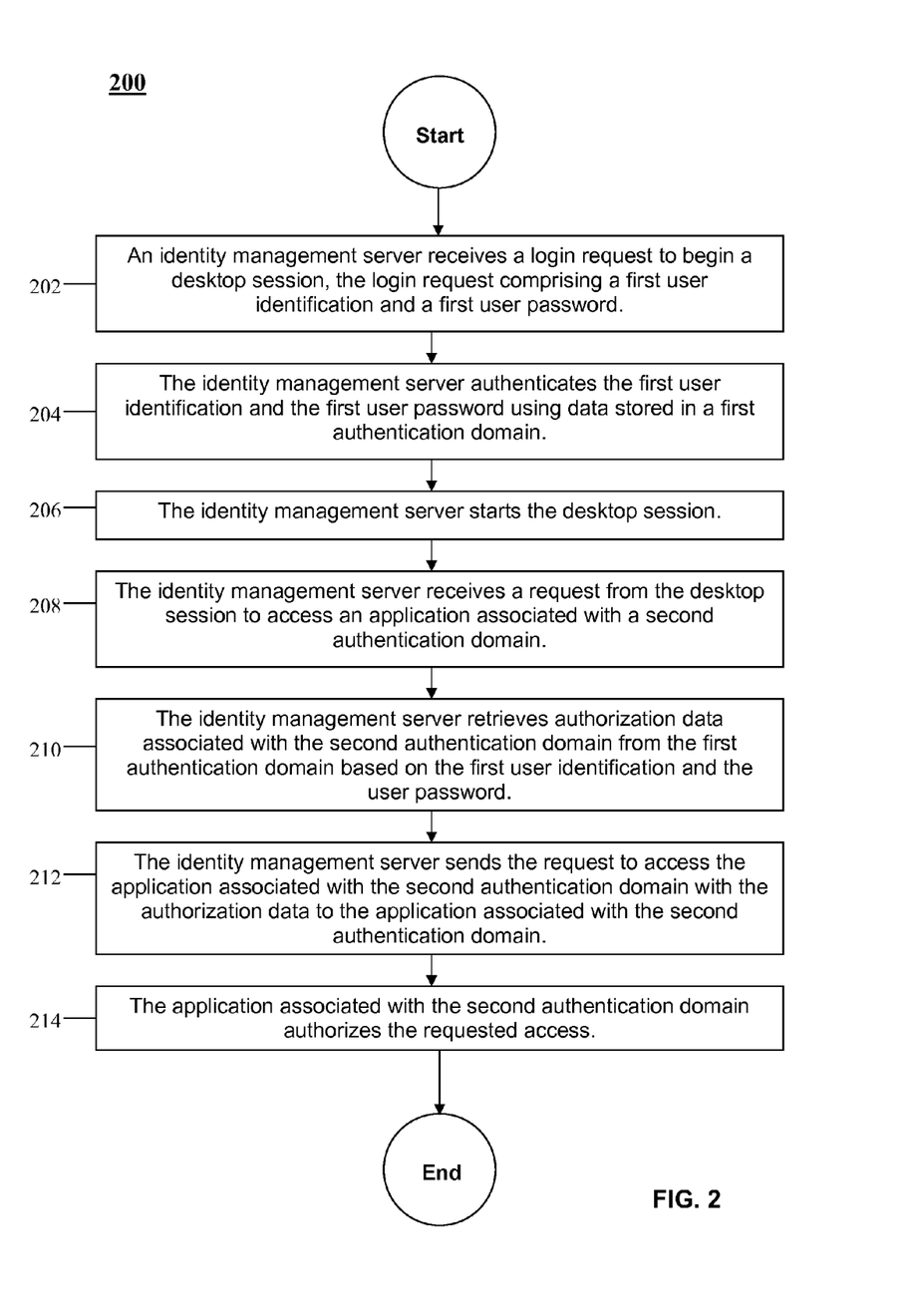
FIG. 2 is a flow chart illustrating a method according to an embodiment of the disclosure.

Turning now to FIG. 2, a method 200 is provided. Beginning at block 202, an identity management server receives a login request to begin a desktop session, the login request comprising a first user identification and a first user password.

At block 204, the identity management server authenticates the first user identification and the first user password using data stored in a first authentication domain. At block 206, the identity management server starts the desktop session.

At block 208, the identity management server receives a request from the desktop session to access an application associated with a second authentication domain. At block 210, the identity management server retrieves authorization data associated with the second authentication domain from the first authentication domain based on the first user identification and the user password.

At block 212, the identity management server sends the request to access the application associated with the second authentication domain with the authorization data to the application associated with the second authentication domain. At block 214, the application associated with the second authentication domain authorizes the requested access.

Figure 3:
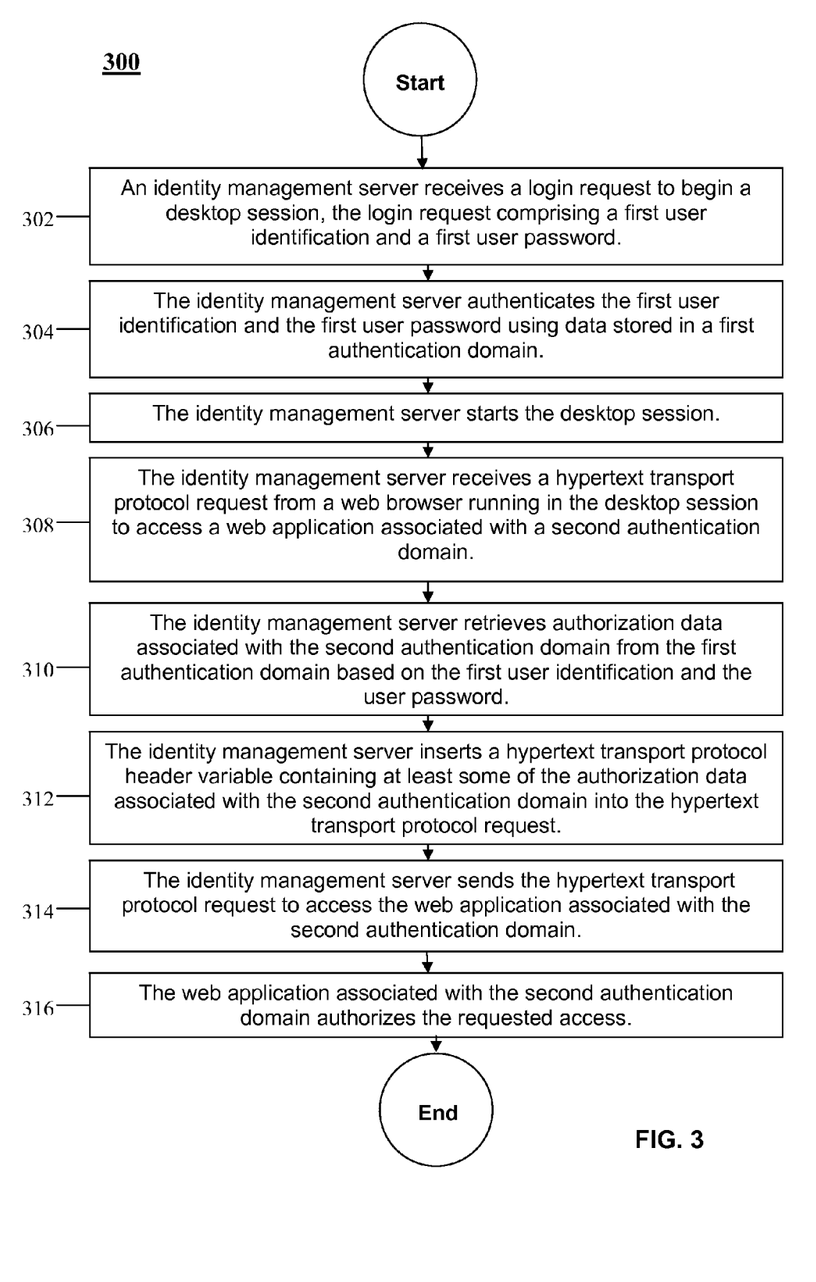
FIG. 3 is a flow chart illustrating a method according to an embodiment of the disclosure.

Turning now to FIG. 3, a method 300 of authenticating a hypertext transport protocol (HTTP) request for a web application is provided. Beginning at block 302, an identity management server receives a login request to begin a desktop session, the login request comprising a first user identification and a first user password.

At block 304, the identity management server authenticates the first user identification and the first user password using data stored in a first authentication domain. At block 306, the identity management server starts the desktop session.

At block 308, the identity management server receives a hypertext transport protocol request from a web browser running in the desktop session to access a web application associated with a second authentication domain. At block 310, the identity management server retrieves authorization data associated with the second authentication domain from the first authentication domain based on the first user identification and the user password.

At block 312, the identity management server inserts a hypertext transport protocol header variable containing at least some of the authorization data associated with the second authentication domain into the hypertext transport protocol request. At block 314, the identity management server sends the hypertext transport protocol request to access the web application associated with the second authentication domain.

At block 316, the web application associated with the second authentication domain authorizes the requested access.

Figure 4A:
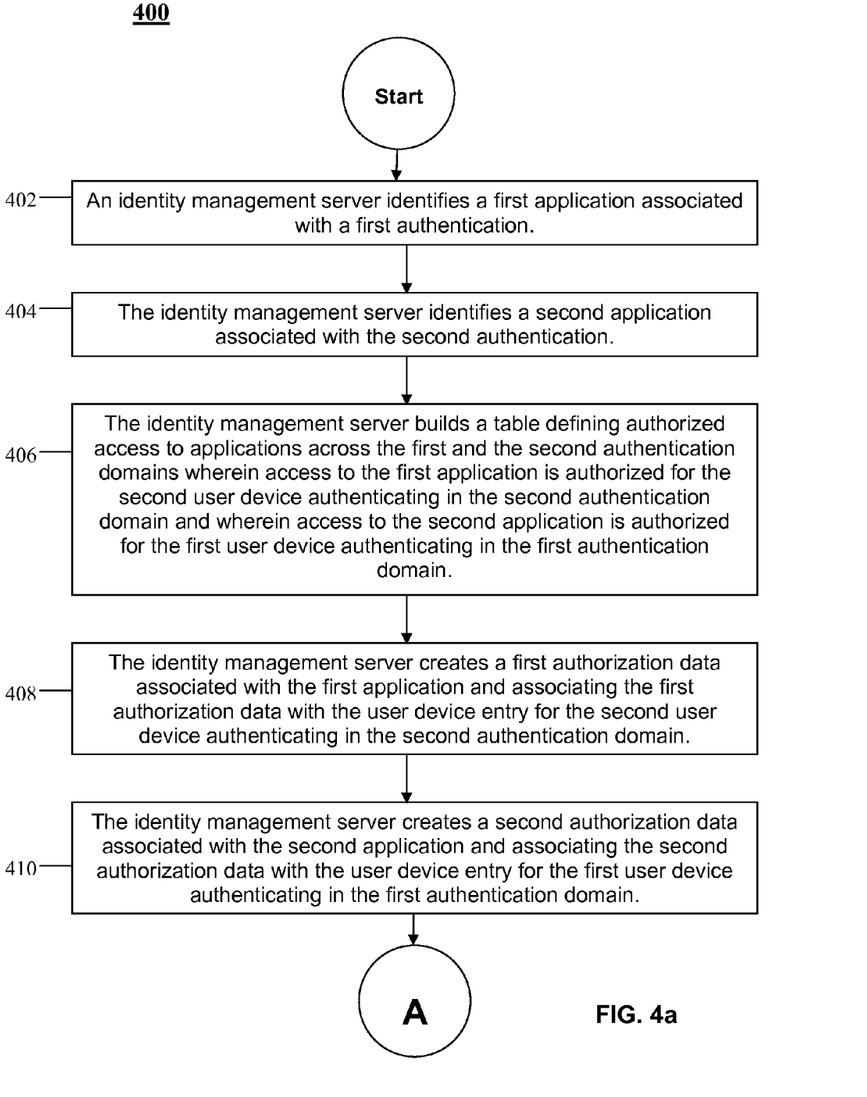
FIG. 4*a* is a flow chart illustrating a method according to an embodiment of the disclosure.
Figure 4B:
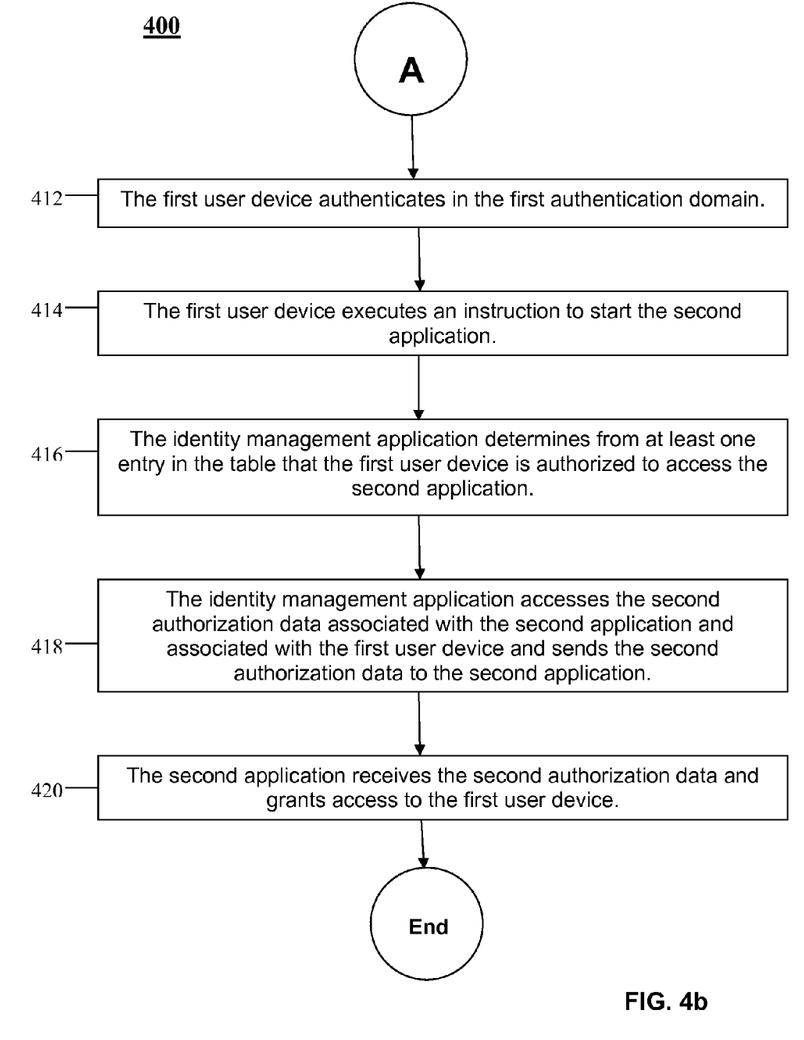
FIG. 4*b* is a flow chart illustrating a method according to an embodiment of the disclosure.

Turning now to FIG. 4a and FIG. 4b, a method 400 is provided. Beginning at block 402, an identity management server identifies a first application associated with a first authentication domain. At block 404, the identity management server identifies a second application associated with the second authentication domain.

At block 406, the identity management server builds a table defining authorized access to applications across the first and the second authentication domains wherein access to the first application is authorized for the second user device authenticating in the second authentication domain and wherein access to the second application is authorized for the first user device authenticating in the first authentication domain. At block 408, the identity management server creates a first authorization data associated with the first application and associating the first authorization data with the user device entry for the second user device authenticating in the second authentication domain.

At block 410, the identity management server creates a second authorization data associated with the second application and associating the second authorization data with the user device entry for the first user device authenticating in the first authentication domain. At block 412, the first user device authenticates in the first authentication domain.

At block 414, the first user device executes an instruction to start the second application. At block 416, the identity management application determines from at least one entry in the table that the first user device is authorized to access the second application.

At block 418, the identity management application accesses the second authorization data associated with the second application and associated with the first user device and sends the second authorization data to the second application. At block 420, the second application receives the second authorization data and grants access to the first user device.

Figure 5:
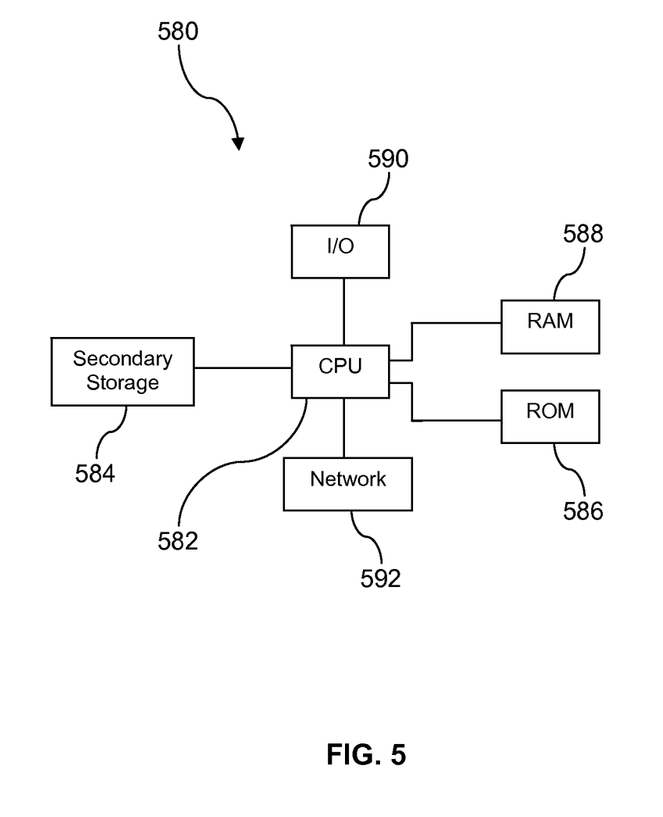
FIG. 5 illustrates an exemplary computer system suitable for implementing some aspects of the several embodiments of the disclosure.

FIG. 5 illustrates a computer system 580 suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, and/or the ROM 586 may be referred to in some contexts as non-transitory storage and/or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard drives, floppy disks, optical disks, and/or other device, the ROM 586, and/or the RAM 588 may be referred to in some contexts as non-transitory instructions and/or non-transitory information.

In an embodiment, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 580 to provide the functionality of a number of servers that is not directly bound to the number of computers in the computer system 580. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data in part by directly accessing the computer program product, for example by reading from a CD-ROM disk inserted into a disk drive peripheral of the computer system 580. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method, comprising:
identifying, by an identity management server, an application associated with a first authentication domain of a first business organization;
identifying, by the identity management server, a web application associated with a second authentication domain of a second business organization, wherein the first business organization and the second business organization have been joined by a merger;
building, by the identity management server, a table comprising a plurality of entries defining authorized access for a first user device and a second user device to applications across the first authentication domain and the second authentication domain, wherein access to the application is authorized for the second user device authenticating in the second authentication domain, and wherein access to the web application is authorized for the first user device authenticating in the first authentication domain;
creating, by the identity management server, a first authorization data associated with the application;
associating, by the identity management server, the first authorization data with a user device entry for the second user device authenticating in the second authentication domain;
creating, by the identity management server, a second authorization data associated with the web application;
associating, by the identity management server, the second authorization data with the user device entry for the first user device authenticating in the first authentication domain;
intercepting, by the identify management server, a hypertext transport protocol request for access to the web application from the first user device;
determining, by the identity management server, from at least one entry of the plurality of entries in the table that the first user device authenticating in the first authentication domain is authorized to access the web application associated with the second authentication domain;
accessing, by the identity management server, the second authorization data associated with the web application and associated with the first user device;
inserting, by the identity management server, a hypertext transport protocol header variable containing at least some of the second authorization data into the hypertext transport protocol request for access to the web application; and
sending, by the identity management server, the hypertext transport protocol request for access including the inserted hypertext transport protocol header variable, which contains the at least some of the second authorization data, to the web application, wherein the web application grants access to the first user device based on receiving the at least some of the second authorization data included in the inserted hypertext transport protocol header variable.

2. The method of claim 1, wherein the first authorization data comprises a plurality of attributes associated with the application associated with the first authentication domain that are stored in an entry associated with a second user in the second authentication domain.

3. The method of claim 1, wherein the second authorization data comprises a plurality of attributes associated with the web application associated with the second authentication domain that are stored in an entry associated with a first user in the first authentication domain.

4. The method of claim 1, wherein the hypertext transport protocol request is from a web browser.

5. The method of claim 1, wherein associating the second authorization data with the user device entry for the first user device authenticating in the first authentication domain is performed by an identity management application.

6. The method of claim 1, wherein the web application associated with the second authentication domain is an employee data management application or a documentation management application.

7. The method of claim 1, wherein commercial-off-the-shelf software assists with the inserting the hypertext transport protocol header variable containing the at least some of the second authorization data into the hypertext transport protocol request.

8. The method of claim 7, wherein the commercial-off-the-shelf software is CA SiteMinder® software.

9. The method of claim 1, wherein the at least some of the second authorization data is stored in a SMUSERNAME field of the hypertext transport protocol header.

10. The method of claim 1, wherein the at least some of the second authorization data is stored in a PSUSERNAME field of the hypertext transport protocol header.

* * * * *